(12) United States Patent
Murakami et al.

(10) Patent No.: US 9,292,308 B2
(45) Date of Patent: Mar. 22, 2016

(54) INFORMATION-PROCESSING DEVICE AND PROGRAM

(75) Inventors: Keiichi Murakami, Tokyo (JP); Dai Kamiya, Tokyo (JP); Kazuhiro Yamada, Tokyo (JP); Izua Kano, Tokyo (JP); Yasushi Onda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 44 days.

(21) Appl. No.: 13/127,319

(22) PCT Filed: Oct. 7, 2009

(86) PCT No.: PCT/JP2009/067474
§ 371 (c)(1),
(2), (4) Date: May 3, 2011

(87) PCT Pub. No.: WO2010/052987
PCT Pub. Date: May 14, 2010

(65) Prior Publication Data
US 2011/0246917 A1    Oct. 6, 2011

(30) Foreign Application Priority Data
Nov. 4, 2008 (JP) .................. 2008-283498

(51) Int. Cl.
*G06F 17/00* (2006.01)
*G06F 9/44* (2006.01)
*G06F 3/048* (2013.01)
*G06F 3/0481* (2013.01)
*G09G 5/14* (2006.01)

(52) U.S. Cl.
CPC .............. *G06F 9/4443* (2013.01); *G06F 3/048* (2013.01); *G06F 3/0481* (2013.01); *G09G 5/14* (2013.01)

(58) Field of Classification Search
None
See application file for complete search history.

(56) References Cited

U.S. PATENT DOCUMENTS

| | | | |
|---|---|---|---|
| 2003/0076340 A1 | 4/2003 | Hatori et al. | |
| 2006/0192881 A1* | 8/2006 | Sato et al. | 348/333.05 |
| 2006/0224951 A1* | 10/2006 | Burke et al. | 715/513 |
| 2007/0220449 A1* | 9/2007 | Lee | 715/856 |
| 2007/0266093 A1* | 11/2007 | Forstall | G06F 9/4443 709/204 |
| 2008/0270919 A1* | 10/2008 | Kulp | G06F 9/4443 715/762 |

(Continued)

FOREIGN PATENT DOCUMENTS

| | | |
|---|---|---|
| CN | 101042300 A | 9/2007 |
| JP | 2005-165491 | 6/2005 |
| JP | 2007286593 | 11/2007 |

(Continued)

OTHER PUBLICATIONS

"OSF/Motif Programmers Guide Release 1.1 AIX RISC System/6000 AIX windows 1st edition Open Software Foundation," 1st edition, IBM Japan, Ltd., Dec. 24, 2002.

(Continued)

*Primary Examiner* — Keith Bloomquist
(74) *Attorney, Agent, or Firm* — MKG LLC

(57) ABSTRACT

The window display application controls a display position of a window (an image). The Java Runtime Environment controls processing associated with the window (e.g., displaying of the window). Operation information on an operation of a display position of a window is supplied to the window display application. Operation information on an operation of processing details of an application corresponding to a window (a widget) is supplied to the Java Runtime Environment.

4 Claims, 4 Drawing Sheets

(56) References Cited

U.S. PATENT DOCUMENTS

2009/0132942 A1* 5/2009 Santoro ............... G06F 3/0481
  715/765
2009/0282423 A1* 11/2009 Smith et al. .................. 719/328

FOREIGN PATENT DOCUMENTS

| JP | 2008-017457 | 1/2008 |
| JP | 2008-217131 | 9/2008 |

OTHER PUBLICATIONS

Japanese Office Action for corresponding application 2008-283798 dated Oct. 18, 2011, with English translation attached.
First Notification of Office Action issued in Chinese Patent Application No. 200980143546.X issued on Sep. 26, 2012.
User Manual for iPod Touch; Chapters 2 and 3 (foreign language and English translation); Apple Inc, 2008.
2nd Notification of Office Action issued in Chinese Patent Application No. 200980143546.X dated Jan. 14, 2013.
Supplementary European Search Report issued in European Patent Application No. 09824687.9 dated Dec. 6, 2012.
European Office Action issued in European Patent Application No. 09824687.9 dated Dec. 18, 2012.
Chinese Office Action for corresponding Chinese Application No. 200980143546.X dated Jul. 1, 2013.
Decision of Rejection issued by the Chinese Patent Office for corresponding Application No. 200980143546.X date of issuance Nov. 5, 2013.

* cited by examiner

INFORMATION-PROCESSING DEVICE AND PROGRAM

TECHNICAL FIELD

The present invention relates to a GUI (Graphical User Interface).

BACKGROUND

An information-processing device such as a mobile phone, executing plural pieces of application software (hereinafter, simply referred to as "applications"), is known (for example, refer to patent document 1). A great variety of applications are executed by a mobile phone, including both applications prepared by a maker of the mobile phone or a carrier (a telecommunications carrier), and applications delivered from an unofficial site such as an unauthorized site. Further, some mobile phones have different details depending on the model of phone, although the mobile phones share a common platform.

SUMMARY

It is one object of the present invention to achieve execution of a variety of processes by an application more easily.

An information-processing device according to an embodiment of the present invention includes: an acquiring means for acquiring operation information representing an operation; and a controlling means for controlling execution of first software that controls a position or size of an image associated with predetermined processing based on the operation information, and second software that performs processing associated with the image based on the operation information.

The information-processing device according to one aspect of the present invention may include a determining means for determining that operation information on a predetermined key is provided to the first software and the operation information on another predetermined key is provided to the second software.

In the information-processing device according to the present invention, the controlling means may execute the second software so as to control displaying of a content in an area in which the image is displayed in a predetermined area of a display, and may execute the first software so as to control displaying of a content in an area other than the area in which the image is displayed in the display area.

The information-processing device according to the present invention may include a selecting means for selecting, when a plurality of the images are displayed, an image from the plurality of the images, and the controlling means may execute the second software so as to control processing associated with the image selected by the selecting means based on an operation specified by operation information that is determined to be provided to the second software.

A program according to the present invention causes a computer to execute the steps of: acquiring operation information representing an operation; and controlling execution of first software that controls a position or size of an image associated with predetermined processing based on the operation information, and second software that performs processing associated with the image based on the operation information. Also, a program according to the present invention may be downloaded to a computer via a network such as the Internet, and installed in the computer so that the program can be used. Also, the present invention may be implemented in an embodiment of a recording medium such as an optical disk storing the program.

DETAILED DESCRIPTION

Figure 1:
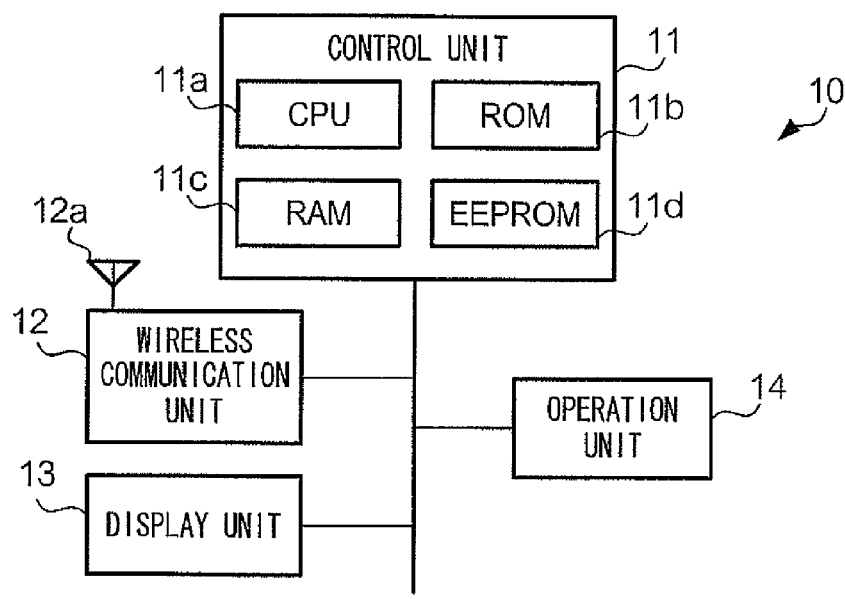
FIG. 1 is a block diagram showing a physical configuration of a communication terminal device.

FIG. 1 is a block diagram showing a physical configuration of a communication terminal device according to an embodiment of the present invention. As shown in the drawing, communication terminal device 10 includes control unit 11, wireless communication unit 12, display unit 13, and operation unit 14. It is to be noted that communication terminal device 10 according to the present embodiment is a mobile phone having a means for inputting and outputting a voice (not shown) such as a microphone and a speaker.

Control unit 11 includes a CPU (Central Processing Unit) 11a, ROM (Read Only Memory) 11b, RAM (Random Access Memory) 11c, and EEPROM (Electronically Erasable and Programmable ROM) 11d, CPU 11a executes a program stored in ROM 11b or EEPROM 11d while using RAM 11c as a work area, thereby controlling an operation of each unit of communication terminal device 10. Wireless communication unit 12 includes antenna 12a, and performs wireless data communication with a predetermined mobile communication network. Display unit 13 includes a liquid crystal display and a liquid crystal driving circuit, and displays an image in a predetermined display area based on display data provided from control unit 11. Operation unit 14 includes plural keys, and provides operation information to control unit 11, which corresponds to a press operation by a user. Operation unit 14 includes at least a key for selecting a window (hereinafter referred to as "cursor key"), and a key for changing the arrangement of the windows (hereinafter referred to as "change key"). By operating the keys, a user is able to select a window or change the arrangement of the windows. It is to be noted that in the present embodiment the cursor key is a key whereby one of four directions of left, right, up, and down is selected. However, the cursor key may be a key whereby a direction other than the four directions, such as an oblique direction (toward upper right or lower left) may be selected. The key may be a so-called hard button, or a touch panel provided on the liquid crystal display.

In the present embodiment, the keys are classified in the first group or the second group. The first group of keys refers to a key for an operation to control a display position of a window. The second group of keys refers to a key for an operation to control processing associated with each window. The first group of keys includes the above cursor key and change key. The second group of keys includes a key not included in the first group of keys. For example, in a mobile phone, the second group of keys may include a so-called numeric keypad. Also, in a mobile phone, a key may be different depending on a model of the mobile phone. In such a case, it is preferred that such a key, if it exists, is included in the second group.

It is to be noted that the first group of keys may include a key for an operation regarding a display size of a window, for example, a key for displaying a certain window to be larger than another window or for emphatically displaying a certain window by, for example, maximizing the displayed size, corresponds to such a key.

It is to be noted that the first and second groups of keys may be classified not only for each key, namely, be classified physically, but also may be classified logically. The logical classification is a classification realized in such a manner that, for example, a certain key belongs to the first group in a certain mode, but the key belongs to the second group in another mode.

ROM 11b pre-stores some programs. Hereinafter, the programs will be referred to as "preinstalled programs." The preinstalled programs include a multitask operating system (hereinafter referred to as "multitask OS," or simply referred to as "OS"), a Java™ platform, and native applications. The multitask OS is an operating system that supports functions such as assignment of a virtual memory space that are necessary to realize pseudo-parallel execution of plural tasks. The Java platform is a set of programs that are described in accordance with a CDC (Connected Device Configuration), which is a configuration for realizing Java Runtime Environment 113 (described later) in communication terminal device 10 in which the multitask OS is installed. The native applications are programs for realizing a basic function of communication terminal device 10 such as a telephone call.

EEPROM 11d includes Java application storage areas for storing Java applications. A Java application includes a JAR (Java Archive) file that is a combination of a substance program that describes a procedure in a Java Runtime Environment, and image files or audio files that are used when the substance program is executed; and an ADF (Application Descriptor File) in which properties of installation and start-up of the JAR file are described. The Java application is prepared by a content provider or a carrier, and stored in an external server device, and can be downloaded from the server device on request by communication terminal device 10.

Figure 2:
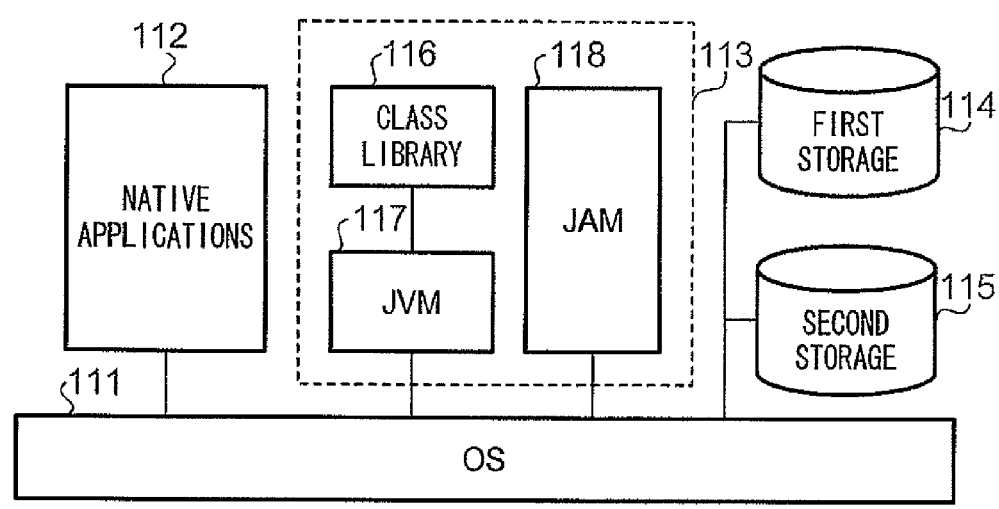
FIG. 2 is a diagram showing a logical configuration of a communication terminal device.

FIG. 2 is a diagram showing a logical configuration of units realized by control unit 11 of communication terminal device 10 by executing programs stored in ROM 11b and EEPROM 11d. As shown in the drawing, in communication terminal device 10 that executes the programs, native applications 112 and Java Runtime Environment 113 are realized in OS 111, and first storage 114 and second storage 115 are secured in EEPROM 11d.

Java Runtime Environment 113 is realized by use of the Java platform stored in ROM 11b. Java Runtime Environment 113 is an example of "second software" of the present invention. Java Runtime Environment 113 includes class library 116, JVM (Java Virtual Machine) 117, and JAM (Java Application Manager) 118. Class library 116 is a file of a combination of program modules (classes) that have a particular function. JVM 117 is a Java Runtime Environment that is optimized for the CDC described above, and has a function of interpreting and executing byte codes provided as a Java application. JAM 118 has a function of managing downloading, installation, start-up, and termination of Java applications.

First storage 114 is an area for storing Java applications, each of which includes a JAR file and an ADF, which are downloaded under control of JAM 118. Second storage 115 is an area in which an individual storage area is assigned to each installed Java application, and is used for storing data generated during running of Java applications after the applications are terminated. Data of a certain Java application in a storage area assigned to the Java application can be rewritten only when the application is running; therefore, the data cannot be rewritten by another Java application.

In the present embodiment, Java applications for displaying plural windows include a "window display application" and a "widget." The window display application is an application (a window system) for displaying one or more windows in a display area of display unit 13, and controlling the display appearance (a display position, a display size, etc.). The window display application is an example of "first software" of the present invention. The window display application may be a native application or a Java application. The "widget" is a Java application that executes predetermined processing on the condition that the window display application displays a window, and realizes a predetermined function.

A "window" of the present embodiment refers to a part of a display area of display unit 13 that is assigned to a widget. The window is displayed as an image that can be distinguished from an image in another part of the display area. The shape and size (area) of the window are determined depending on a widget. However, for example, the shape and size of the window may be changed by a user operation. The window is an example of an "image" of the present invention.

In the present embodiment, plural widgets appear, each widget realizing a different function. The widgets include, for example, a widget for displaying a time and date by displaying a clock image in a window (hereinafter referred to as "clock widget"), a widget for displaying characters input by a user in a window as a memorandum (hereinafter referred to as "memo widget"), or a widget for playing a video or music (hereinafter referred to as "play widget"). Also, the widgets may include a widget that obtains information such as news or weather forecast via wireless communication unit 12 at a predetermined time, and displays the obtained information.

The foregoing is a description of the configuration of communication terminal device 10 according to the present embodiment. With the configuration, communication terminal device 10 executes plural applications in accordance with a request by a user. Communication terminal device 10 according to the present embodiment realizes a multi-window system by displaying windows of widgets. Namely, communication terminal device 10 runs a window display application when displaying plural windows. A user is able to select one from among plural windows or change a window that has been selected by operating the cursor key of operation unit 14.

In the following description, a window that has been selected will be referred to as a "selected window," and a window that has not been selected will be referred to as a "non-selected window" for convenience of explanation. It is to be noted that in the present embodiment the "selection" of a window means providing an input focus to the window. The selected window is determined in accordance with a predetermined rule or a user operation.

Figure 3:
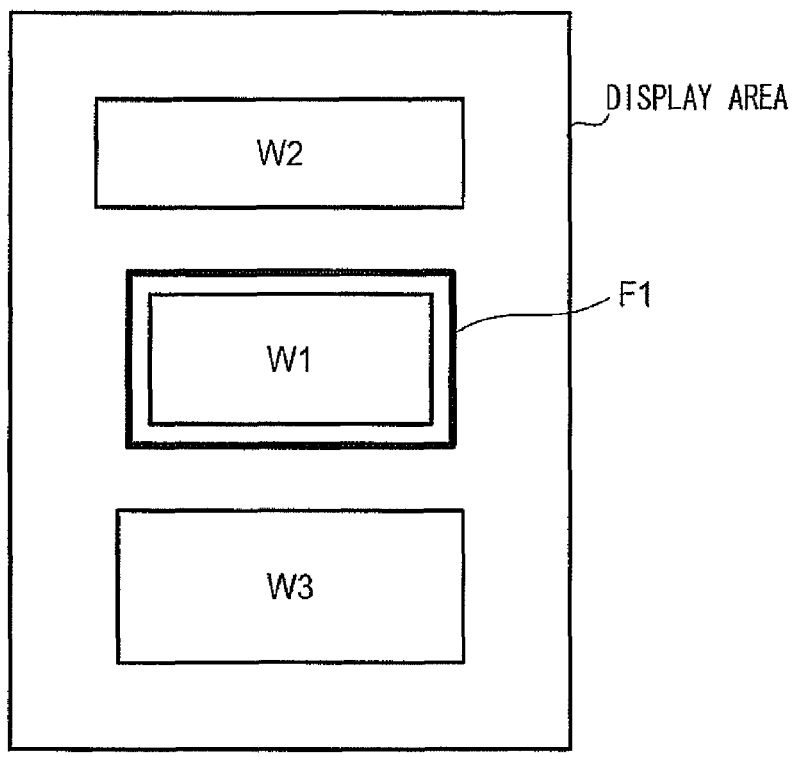
FIG. 3 is a diagram showing an example of a display appearance of a selected window and a non-selected window.

FIG. 3 is a diagram showing an example of a display appearance of a selected window and non-selected windows.

In the drawing, window W1 is a selected window, and windows W2 and W3 are non-selected windows. As is shown in the drawing, the selected window is differentiated from non-selected windows by frame F1 added to surround the selected window. It is to be noted that a method of differentiating a selected window from a non-selected window is not limited to this example, and a method of blinking a selected window or a method of making a non-selected window appear to be translucent may be employed. These display controls are realized by the window display application. In this case, if a user inputs an upward instruction by a key operation, a selected window is changed from window W1 to window W2. Meanwhile, if a user inputs a downward instruction by a key operation, a selected window is changed from window W1 to window W3.

Communication terminal device 10 according to the present embodiment is able to receive from a user both an operation for controlling a display position or selection of a window, and an operation that is provided to a widget associated with the selected window. The former operation is performed by use of the first group of keys. The latter operation is performed by use of the second group of keys. The latter operation is, for example, character editing (input, change, delete, and so on) by a memo widget, or control for video or music playback (play, stop, fast-forward, fast-return, and so on) by a play widget.

Figure 4:
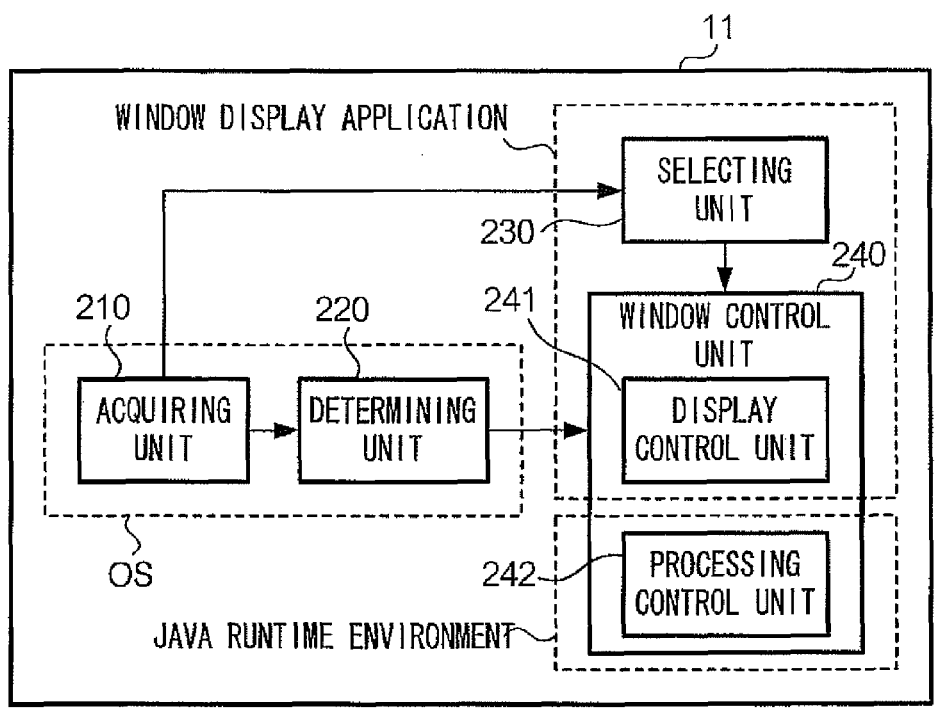
FIG. 4 is a functional block diagram showing functions realized by a communication terminal device.

FIG. 4 is a functional block diagram showing functions realized by control unit 11 of communication terminal device 10 when the control unit displays windows. As is shown in the drawing, control unit 11 of communication terminal device 10 realizes functions corresponding to acquiring unit 210, determining unit 220, selecting unit 230, and window control unit 240 by executing a stored program. In more detail, window control unit 240 is divided in display control unit 241 and processing control unit 242. Acquiring unit 210 and determining unit 220 are functions that are realized by the OS. Selecting unit 230 and display control unit 241 are functions that are realized by the window display application. Processing control unit 242 is a function that is realized by the Java Runtime Environment.

Acquiring unit 210 serves to acquire operation information from operation unit 14. Acquiring unit 210 specifies details of a user operation based on both a key operated by a user and processing details that are currently executed by control unit 11. Determining unit 220 serves to determine a supply destination of the operation information acquired by acquiring unit 210 to either display control unit 241 or processing control unit 242. Determining unit 220 determines the supply destination of the operation information in accordance with a predetermined rule. In the present embodiment, a supply destination of operation information representing an operation of the first group of keys is control unit 241, and a supply destination of operation information representing an operation of the second group of keys is processing control unit 242. Selecting unit 230 serves to specify a selected window. For example, when a selected window is changed by a user operation, selecting unit 230 selects one from among non-selected windows based on the user operation, and sets the newly selected window as a selected window. Selecting unit 230 also supplies information for identification of a selected window.

Window control unit 240 serves to execute a control regarding a window. Display control unit 241 executes a control regarding displaying of each window. Processing control unit 242 executes a control regarding processing of a widget corresponding to each window. Display control unit 241 is intended for controlling a display position of each window, and controlling to distinguish between a selected window and a non-selected window. Processing control unit 242 executes processing in accordance with each widget. Processing control unit 242 receives from a user only an operation regarding a widget corresponding to a selected window. However, processing control unit 242 does not receive from a user an operation regarding other widgets, and carries out predetermined processing to be executed during a non-selected period. The processing during a non-selected period is, for example, "displaying" of a time and date by a clock widget. In contrast, processing during a selected period is "changing" of a time and date or a display appearance (e.g., an exterior) based on a user operation. The changing of a time and date is processing of a so-called clock setting or the like, and the changing of a display appearance is processing to change a color or the like of a clock image.

Figure 5:
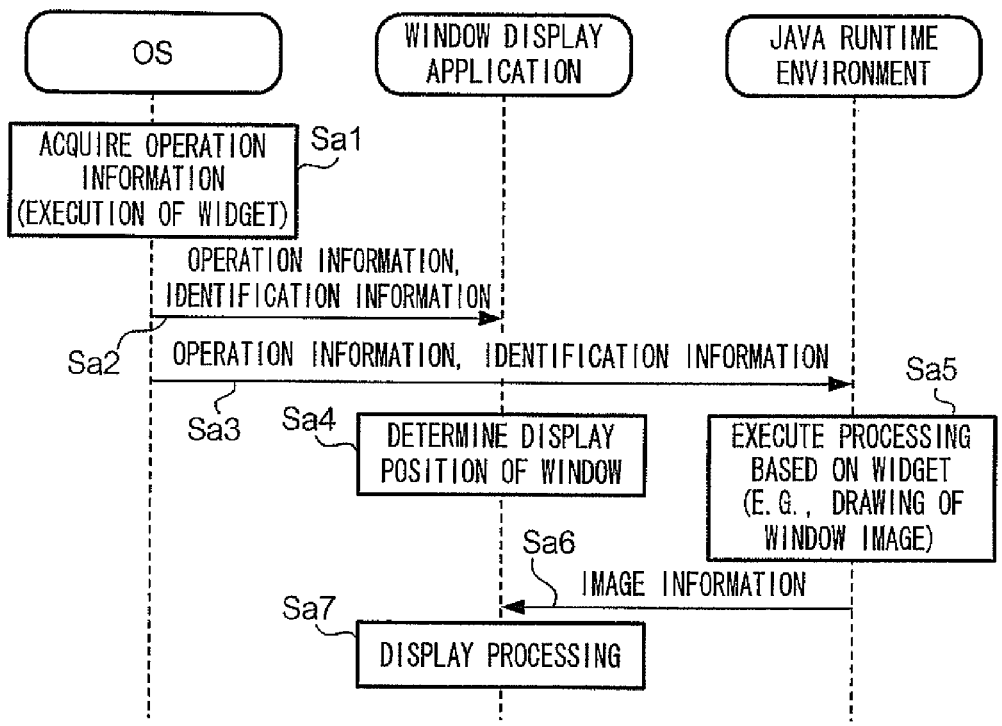
FIG. 5 is a sequence chart showing processing carried out by a communication terminal device.
Figure 6:
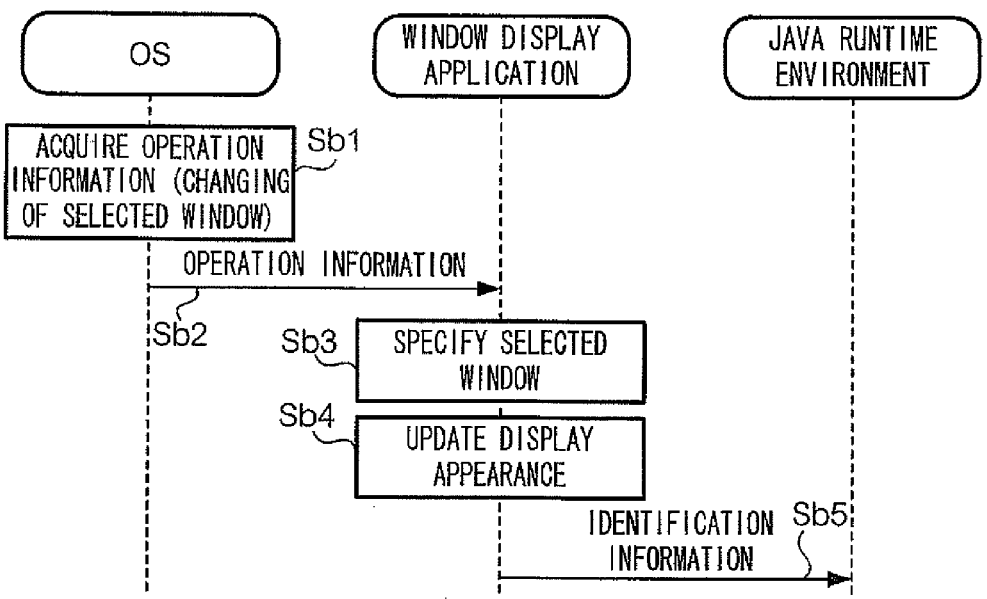
FIG. 6 is a sequence chart showing processing carried out by a communication terminal device.
Figure 7:
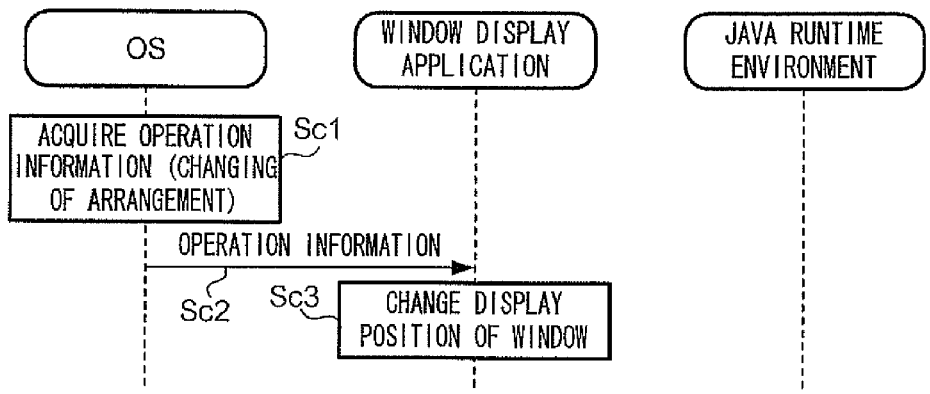
FIG. 7 is a sequence chart showing processing carried out by a communication terminal device.

FIGS. 5, 6, and 7 are sequence charts showing processing carried out when control unit 11 of communication terminal device 10 displays plural windows. An OS, a window display application, and a Java Runtime Environment shown in the drawings are realized by execution of a program by control unit 11 as described above. Also, FIG. 5 shows processing to start displaying a window. Further, FIG. 6 shows processing to change a selected window, and FIG. 7 shows processing to change a display position of a window (in other words, an arrangement).

As shown in FIG. 5, displaying of a window is started when a user inputs an instruction to execute one of the widgets by a key operation, and the OS acquires the operation information (step Sa1). Upon acquiring operation information instructing execution of the widget, namely operation information representing an instruction to display (open) a window associated with the widget, the OS instructs execution of processing to the window display application and Java Runtime Environment based on the operation information (step Sa2, and Sa3). This instruction includes both the operation information, and identification information for identifying the widget (or window) to be processed.

The window display application starts an operation in response to the instruction from the OS. Upon receiving the instruction from the OS, the window display application determines a display position of the window (step Sa4). The window display application determines an appropriate display position of the window taking into consideration the size of the window (a window size) to be displayed. It is to be noted that if another window is already displayed, the window display application may control the display position of the window to be display such that the window does not overlap with the other window, or may change a display position of the other window.

The Java Runtime Environment starts an operation in response to the instruction from the OS. The Java Runtime Environment specifies a widget to be started based on the instruction from the OS, and draws a window image corresponding to the specified widget (step Sa5). It is to be noted that if the specified widget executes processing other than drawing (e.g., music playback), the Java Runtime Environment executes this processing in parallel with the processing in step Sa5. The Java Runtime Environment then passes image information for identifying the drawn window image (e.g., a memory address of the window image) to the window display application (step Sa6).

The window display application takes charge of drawing of an area of a predetermined display area of display unit 13 other than an area in which a window is displayed. That means drawing of an area in which a window is displayed is controlled by the Java Runtime Environment, and drawing of other area is controlled by the window display application. The window display application causes a predetermined image to display in an area other than an area secured as a display position of a window, and simultaneously performs display processing in which a window image drawn by the Java Runtime Environment is displayed in an area secured as a display position of a window (step Sa7).

Figure 8:
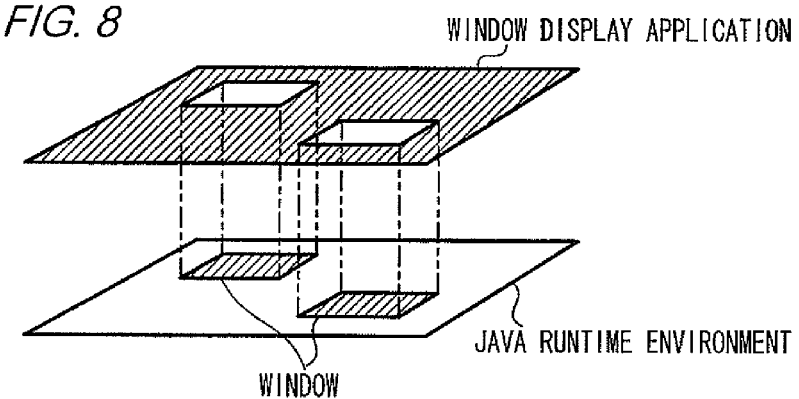
FIG. 8 is a schematic diagram conceptually showing sharing of a drawing control.

FIG. 8 is a schematic diagram conceptually showing sharing of a drawing control. In the drawing, an upper layer indicates an area whose drawing is controlled by the window display application. The area corresponds to an area shown by hatching. On the other hand, a lower layer indicates an area whose drawing is controlled by the Java Runtime Environment. The area corresponds to an area shown by hatching (namely an area in which a window is displayed).

As shown in the drawing, the window display application controls a display position of a window corresponding to a widget. However, the window display application does not contribute to displaying content of the window. The display content of the windows is controlled by the Java Runtime Environment.

Also, as shown in FIG. 6, changing of a selected window is started when a user presses (operates) a cursor key, and the OS acquires the operation information (step Sb1). Upon acquiring the operation information that instructs changing of a selected window, the OS instructs execution of processing to the window display application based on the operation information (step Sb2). The window display application specifies an operation direction based on the instruction from the OS, and specifies a non-selected window that is displayed in the operation direction on the basis of a window being selected at the time as a new selected window (step Sb3). When specifying the new selected window, the window display application changes (updates) a display appearance (for example, displaying of the above frame F1) (step Sb4). The window display application then supplies identification information for identifying the selected window to the Java Runtime Environment to enable the Java Runtime Environment to identify the selected window (step Sb5).

Further, as shown in FIG. 7, changing of a window arrangement is started when a user presses (operates) a change key, and the OS acquires the operation information (step Sc1). Upon acquiring the operation information that instructs to change a display position of a window that is currently displayed, the OS instructs execution of processing to the window display application based on the operation information (step Sc2). The window display application appropriately changes a display position of a window based on the instruction from the OS (step Sc3). In the present embodiment, the display position of the window is determined in accordance with a predetermined rule. However, a display position of each window may be specified by a user.

When a window arrangement is changed, only a display position is changed for each window. The Java Runtime Environment accordingly can execute processing free of an influence from changing of a window arrangement.

Figure 9:
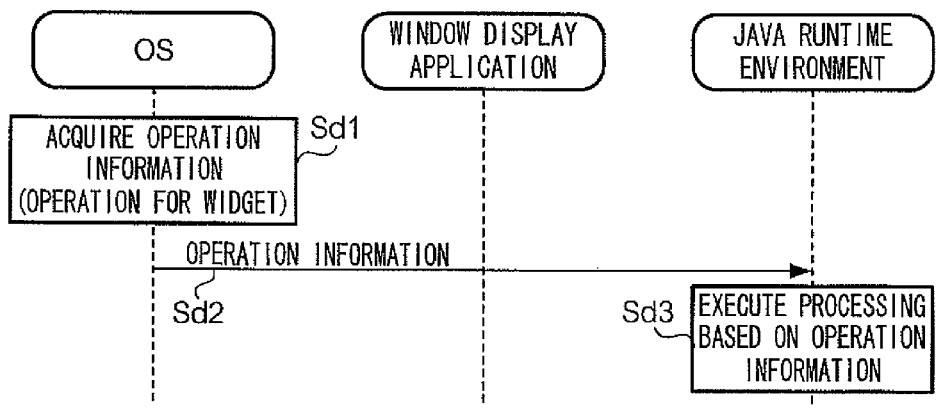
FIG. 9 is a sequence chart showing processing carried out by a communication terminal device.

FIG. 9 is a sequence chart showing processing carried out when control unit 11 of communication terminal device 10 receives an operation instruction for a widget. As is shown in the drawing, when acquiring operation information representing an operation for a widget (in the present embodiment, a key operation using the second group of keys) (step Sd1), the OS supplies the operation information to the Java Runtime Environment without supplying it to the window display application (step Sd2). Upon receiving the operation information, the Java Runtime Environment executes processing based on the operation information (step Sd3).

As is described above, according to the communication terminal device 10 of the present embodiment, operation information is exchanged without being exchanged between the window display application and the Java Runtime Environment. In addition, information on an operation of a widget is exchanged without passing through the window display application. Therefore, according to the present embodiment, a widget designer can design a widget regardless of details of a data exchange between the window display application and the Java Runtime Environment. A widget designer accordingly can design a widget more freely. In other words, a widget designer can design a widget free from a specification or settings of the window display application.

For example, according to the present embodiment, a widget designer can allow a widget to receive an input that is not expected initially. It is assumed as an example that a mobile phone is newly sold, and that the mobile phone includes all functions of communication terminal device 10 of the present embodiment, and also includes a new key that is not included in a conventional mobile phone. In this case, this new mobile phone is able to identify an operation of a new key as an operation instruction to a widget, although a window display application of this new mobile phone is the same as that of a conventional mobile phone. In other words, when employing the configuration as described in the present embodiment, it is possible to recognize an input of a new key only if a widget is designed to recognize the input of the new key, without changing a designation of a window display application to recognize the new key. However, if operation instruction for a widget is exchanged via the window display application, the widget is not able to receive the operation instruction corresponding to the new key without a designation being changed such that the window display application is able to recognize the new key.

Also, in a case where an operation instruction for a widget is exchanged via a window display application, if the window display application is, for example, designed in a specification "when plural keys are pressed simultaneously, operation information corresponding to one of the plural keys is enabled, and the other operation information is disabled," a widget is not able to recognize a state in which plural keys are pressed simultaneously. However, when employing the configuration as described in the present embodiment, it is possible to allow a widget to recognize a state in which plural keys are pressed simultaneously, regardless of a designation of the window display application. Similarly, for example, it is possible to determine a rule that determines a number of instances of pressing corresponding to pressing of an identical key over a long period (known as a long pressing) depending on an intention of a widget designer, regardless of a specification or settings of the window display application.

Further, according to the present embodiment, since a window display application does not have to contribute to displaying content of window and operation information received by a widget, it is possible to reduce processing controlled by the window display application. Furthermore, according to the present embodiment, although a key, other than a predetermined key that is required for changing of selection of a window or an arrangement of windows, is changed, a window display application does not have to be changed in accordance with the change. Accordingly, it is possible to use the common window display application in plural mobile phones even if the mobile phones have a different number or type of keys.

MODIFICATIONS

The present invention may be implemented in an embodiment that is different from the above embodiment. For example, the present invention may be implemented in the embodiments described below. Also, the following modifications may be combined with each other.

(1) Modification 1

A window according to the present invention may be not only a display area assigned to a "widget" of the above embodiment, but also a display area assigned to another application such as a native application. Also, a widget may be not only a Java application, but also another application. Further, the first software according to the present invention may be not only application software, but also an OS including a window system.

Also, a widget may obtain information via a means other than wireless communication unit 12. For example, if an information-processing device according to the present invention has a so-called IC tag, a widget may obtain information stored in the IC tag. Alternatively, if an information-processing device according to the present invention has a GPS positioning function, a widget may obtain location information (a latitude and longitude or a distance from a given point) using the positioning function.

(2) Modification 2

In the above embodiment, control unit 11 includes all configurations required for the information-processing device according to the present invention. Accordingly, in the above embodiment, control unit 11 may be deemed as corresponding to an information-processing device according to the present invention, and communication terminal device 10 may be deemed as corresponding to the information-processing device. An operation according to the present invention may be not only a pressing of a key, but also recognition of a vocal instruction.

The above embodiment is an embodiment in which the present invention is applied to a mobile phone. However, the present invention may be applied to other electronic devices. The present invention may be applied to various information-processing devices including a communication terminal device such as a PDA (Personal Digital Assistant), a camera, a portable music player, and a portable game device.

What is claimed is:

1. An information-processing device comprising:
   a controller;
   a memory that stores a first software for controlling an arrangement of at least one first widget window and a plurality of second software each comprising a respective widget for performing different functionalities and each associated with a respective second widget window; the first software responsible for rendering of an upper layer independently from a rendering by the second software responsible for rendering of a lower layer; and
   a first key belonging to a first group of keys and a second key belonging to a second group of keys, the second key being a different key than the first key, the first group of keys operable with the first software and the second group of keys operable with the second software;
   the controller configured to
      acquire first operation information representing an operation of the first key, and second operation information representing an operation of the second key,
      upon acquiring the first operation information and the acquired first operation information instructing to change a currently selected widget window included in the at least one first widget window, determine that the acquired first operation information is provided to the first software, and provide the acquired first operation information to the first software,
      specify a non-selected widget window included in the at least one first widget window as a new selected widget window by the first software based on the first operation information, and change a display appearance of the new selected widget window by the first software,
      upon acquiring the first operation information or the second operation information, and the acquired first operation information or the acquired second operation information instructing to display the at least one first widget window, determine that the acquired first operation information or the acquired second operation information is provided to both the first software and the second software, and provide the acquired first operation information or the acquired second operation information to both the first software and the second software,
      upon acquiring the first operation information and the acquired first operation information instructing to change a widget window arrangement, determine that the acquired first operation information is provided to the first software, and provide the acquired first operation information to the first software,
      upon acquiring the second operation information and the second operation information representing an operation for the predetermined processing, determine that the acquired second operation information is provided to the second software, and provide the acquired second operation information to the second software without passing through the first software,
      control execution of the first software based on the first operation information provided to the first software,
      control the displaying of the at least one first widget window by the first software based on the first operation information,
      control execution of the second software based on the second operation information provided to the second software, and
      control the execution of a predetermined processing associated with the at least one first widget window by the second software based on the second operation information.

2. The information-processing device according to claim 1, wherein the controller is further configured to control the execution of the second software so as to control displaying of a first content in a first predetermined area of a display in which the at least one first widget window is displayed, and to execute the first software so as to control displaying of a second content in a second predetermined area of the display.

3. The information-processing device according to claim 1, wherein the controller is further configured to select, when a plurality of windows associated with a predetermined processing are displayed, at least one second widget window from the plurality of windows, wherein
   the controller is configured to control the execution of the second software so as to control processing associated with the at least one second widget window selected based on an operation specified by the operation information that is determined to be provided to the second software.

4. A non-transitory computer-readable medium storing a program for causing a computer to execute the steps of:
   displaying at least one widget window;

acquiring first operation information representing an operation of a first key, and second operation information representing an operation of a second key, the second key being a different key than the first key, the first key belonging to a first group of keys and the second key belonging to a second group of keys, the first group of keys operable with a first software and the second group of keys operable a the second software, the first software responsible for rendering of an upper layer independently from rendering by the second software responsible for rendering of a lower layer;

upon acquiring the first operation information and the acquired first operation information instructing to change a currently selected widget window included in the at least one widget window, determining that the acquired first operation information is provided to the first software, and providing the acquired first operation information to the first software;

specifying a non-selected window included in the at least one widget window as a new selected widget window by the first software based on the first operation information, and changing a display appearance of the new selected widget window by the first software;

upon acquiring the first operation information or the second operation information, and the acquired first operation information or the acquired second operation information instructing to display the at least one widget window, determining that the acquired first operation information or the acquired second operation information is provided to both the first software and the second software, and providing the acquired first operation information or the acquired second operation information to both the first software and the second software;

upon acquiring the first operation information and the acquired first operation information instructing to change a widget window arrangement, determining that the acquired first operation information is provided to the first software, and providing the acquired first operation information to the first software;

upon acquiring the second operation information and the second operation information representing an operation for the predetermined processing, determining that the acquired second operation information is provided to the second software, and providing the acquired second operation information to the second software without passing through the first software;

controlling execution of the first software based on the first operation information provided to the first software;

controlling a display by the first software of the at least one widget window associated with a predetermined processing based on the first operation information;

controlling execution of the second software based on the second operation information provided to the second software, and controlling execution by the second software of the predetermined processing associated with the at least one widget window based on the second operation information.

* * * * *